US010618504B2

(12) United States Patent
Ozeki et al.

(10) Patent No.: US 10,618,504 B2
(45) Date of Patent: Apr. 14, 2020

(54) BRAKING DEVICE FOR VEHICLE (71) Applicants: ADVICS CO., LTD., Kariya-shi, Aichi-ken (JP); TOYOTA JIDOSHA KABUSHIKI KAISHA, Toyota-shi, Aichi-ken (JP)

(72) Inventors: Yoshimitsu Ozeki, Nagoya (JP); Yusuke Kamiya, Okazaki (JP)

(73) Assignees: ADVICS CO., LTD., Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 160 days.

(21) Appl. No.: 15/773,603

(22) PCT Filed: Nov. 24, 2016

(86) PCT No.: PCT/JP2016/084861
§ 371 (c)(1),
(2) Date: May 4, 2018

(87) PCT Pub. No.: WO2017/090696
PCT Pub. Date: Jun. 1, 2017

(65) Prior Publication Data
US 2019/0023242 A1    Jan. 24, 2019

(30) Foreign Application Priority Data

Nov. 27, 2015    (JP) .................................. 2015-231366

(51) Int. Cl.
*B60T 8/17*    (2006.01)
*B60T 7/04*    (2006.01)
(Continued)

(52) U.S. Cl.
CPC ................ *B60T 8/17* (2013.01); *B60T 7/042* (2013.01); *B60T 8/171* (2013.01); *B60T 8/409* (2013.01);
(Continued)

(58) Field of Classification Search
CPC . B60T 8/17; B60T 13/58; B60T 8/171; B60T 13/161; B60T 17/221;
(Continued)

(56) References Cited

U.S. PATENT DOCUMENTS 5,899,068 A    5/1999 Nishii et al.
9,499,147 B2 *  11/2016 Yamasoe ................. B60T 7/042
(Continued)

FOREIGN PATENT DOCUMENTS

JP    H-09-315288 A    12/1997
JP    2009-274626 A    11/2009
(Continued)

OTHER PUBLICATIONS

International Search Report (PCT/ISA/210) dated Feb. 21, 2017, by the Japan Patent Office as the International Searching Authority for International Application No. PCT/JP2016/084861.
(Continued)

*Primary Examiner* — Pamela Rodriguez
(74) *Attorney, Agent, or Firm* — Buchanan Ingersoll & Rooney PC (57) ABSTRACT The braking device for a vehicle includes an operation judging portion which judges whether or not the operating amount in the increasing stage is equal to or more than a predetermined threshold amount or whether or not an increasing speed of the operating amount in the increasing stage is equal to or more than a predetermined threshold speed and a control portion which selects the first operating mode as the operating mode from a start of the increasing
(Continued)

stage until a first timing or a second timing and selects the second operating mode as the operating mode in the increasing stage after the first timing or the second timing and at the same time maintains the drive hydraulic pressure in the increasing stage after the first timing or the second timing.

6 Claims, 4 Drawing Sheets

(51) Int. Cl.
  *B60T 13/68* (2006.01)
  *B60T 8/40* (2006.01)
  *B60T 13/14* (2006.01)
  *B60T 13/66* (2006.01)
  *B60T 8/171* (2006.01)
  *B60T 13/58* (2006.01)
  *B60T 17/22* (2006.01)
  *B60T 13/16* (2006.01)
(52) U.S. Cl.
  CPC .......... *B60T 8/4072* (2013.01); *B60T 8/4077* (2013.01); *B60T 13/146* (2013.01); *B60T 13/58* (2013.01); *B60T 13/662* (2013.01); *B60T 13/686* (2013.01); *B60T 17/221* (2013.01); *B60T 13/161* (2013.01); *B60T 2270/402* (2013.01); *B60T 2270/404* (2013.01); *B60T 2270/82* (2013.01)
(58) Field of Classification Search
  CPC .......... B60T 2270/82; B60T 2270/404; B60T 2270/402; B60T 8/4072; B60T 8/409; B60T 8/885; B60T 8/4077; B60T 7/042; B60T 11/16; B60T 13/146; B60T 13/662; B60T 13/686

USPC ....... 303/14, 150, 155, 157, 158; 188/106 P; 701/70
See application file for complete search history.

(56) References Cited

U.S. PATENT DOCUMENTS

| | | | |
|---|---|---|---|
| 9,663,086 B2* | 5/2017 | Ozeki | B60T 7/042 |
| 2010/0295363 A1* | 11/2010 | Miyazaki | B60T 8/4063 303/11 |
| 2012/0150619 A1* | 6/2012 | Jacob Sushil | G06Q 30/0207 705/14.39 |
| 2013/0127241 A1 | 5/2013 | Sakata | |
| 2013/0221736 A1* | 8/2013 | Kuki | B60T 13/686 303/20 |
| 2014/0008967 A1* | 1/2014 | Takeuchi | B60T 13/161 303/155 |
| 2015/0151729 A1* | 6/2015 | Yamasoe | B60T 7/042 303/122.03 |
| 2016/0339889 A1* | 11/2016 | Okano | B60T 7/042 |

FOREIGN PATENT DOCUMENTS

| | | |
|---|---|---|
| JP | 2012-016984 A | 1/2012 |
| JP | 2013-107559 A | 6/2013 |
| JP | 2014-15200 A | 1/2014 |

OTHER PUBLICATIONS

Written Opinion (PCT/ISA/237) dated Feb. 21, 2017, by the Japan Patent Office as the International Searching Authority for International Application No. PCT/JP2016/084861.

* cited by examiner

CYLINDER OPENING SIDE ⟵⟶ CYLINDER BOTTOM SURFACE SIDE

BRAKING DEVICE FOR VEHICLE

TECHNICAL FIELD

This invention relates to a braking device for a vehicle.

BACKGROUND ART

As an example of a braking device for a vehicle for controlling a friction braking force applied to a vehicle, the braking device for a vehicle disclosed in a Patent Publication No. JP2012-16984 A has been known. This braking device includes a master cylinder device which generates a master hydraulic pressure by driving the output piston which is driven by applying the servo pressure generated based on the pressure of the pressure source (accumulator), under the state that the input piston and the output piston are separated in the in-between pistons chamber.

CITATION LIST

Patent Literature

[Patent Literature 1] JP2012-16984 A

SUMMARY OF INVENTION

Technical Problem(s)

According to the braking device for a vehicle as explained above, the operating fluid is pressurized depending exclusively on the operating force without using the function of the stroke simulator and by fluid-tightly sealing the in-between pistons chamber. In other words, as an operating mode (operating type), the braking device for vehicle has two operating modes, one being a control of hydraulic pressure by controlling the electromagnetic valve and the other pressurizing the operating fluid by allowing the transmission of the operating force. However, there is still a necessity for improving the operating mode in an appropriate switching between the two operating modes, depending on the situations, considering a feeling (brake feeling) to the brake operation by the driver of the vehicle.

Accordingly, this invention was made in consideration with the above-mentioned situation and the objective of the invention is to provide a braking device for a vehicle which can appropriately perform switching of the operating modes, depending on the situations, while suppressing worsening of brake feeling in the brake operation.

Solution to Problem(s)

The braking device for a vehicle according to the invention is capable of switching over an operating mode between a first operating mode in which a master piston or a drive piston which drives the master piston is driven by a drive hydraulic pressure based on a hydraulic pressure of a pressure source in response to a detection result of a brake operation by a driver of the vehicle and a second operating mode in which the brake operation by the driver of the vehicle is mechanically transmitted to the master piston. The braking device for the vehicle includes an operation judging portion which judges, in a brake stage having an increasing stage where an operating amount of the brake operation by the driver of the vehicle increases from a value of zero and a decreasing stage where the operating amount decreases to the value of zero, whether or not the operating amount in the increasing stage is equal to or more than a predetermined threshold amount or whether or not an increasing speed of the operating amount in the increasing stage is equal to or more than a predetermined threshold speed and a control portion which selects the first operating mode as the operating mode, at least from a start of the increasing stage until a first timing where the operating amount is judged to be equal to or more than the predetermined threshold amount by the operation judging portion or until a second timing where the increasing speed is judged to be equal to or more than the predetermined threshold speed by the operation judging portion and selects the second operating mode as the operating mode in the increasing stage after the first timing or the second timing and at the same time maintains the drive hydraulic pressure.

Effect of Invention

According to the invention, since the first operating mode is selected, as the operating mode, in the period from the start of the brake stage until at least the first timing or the second timing, the brake operation in this period is the same as a normal brake operation. Accordingly, the brake feeling of the driver of the vehicle is not changed. The increase stage after the first timing or the second timing, for example, under a situation that a drive force higher than the hydraulic pressure of the pressure source is required for the master piston, the second operating mode is selected as the operating mode and thus a high drive force added by a mechanical brake operation force by the driver of the vehicle is generated and such force is applied to the master piston. Then, upon switching over operation of the operating mode, since the drive hydraulic pressure is maintained, even in the second operating mode in which the brake operation and the movement of the master piston are mechanically co-operated, any change in the brake operation due to the change of the drive hydraulic pressure does not occur. Thus, at least in the increase stage of the brake stage, a worsening of brake feeling can be avoided. As explained, according to the invention, the worsening of the brake feeling can be suppressed and at the same time the operating mode can be appropriately switched over depending on the situations.

It is noted here that the predetermined threshold amount is preferably defined to be the value equal to or less than the operating amount at which the drive hydraulic pressure reaches to a hydraulic pressure corresponding to a hydraulic pressure of the pressure source in the first operating mode. In the increasing state, when the drive hydraulic pressure reaches to the hydraulic pressure corresponding to the hydraulic pressure of the pressure source, the drive hydraulic pressure (and accordingly, the master hydraulic pressure) does not increase relative to the increase of the operating amount in the first operating mode. i.e., an ineffective operating amount is generated. To this, by switching over the operating mode from the first operating mode to the second operating mode in the increasing stage before the drive hydraulic pressure reaches to the hydraulic pressure corresponding to the hydraulic pressure of the pressure source, a generation of the ineffective operating amount can be prevented.

EMBODIMENTS FOR IMPLEMENTING INVENTION

Figure 1:
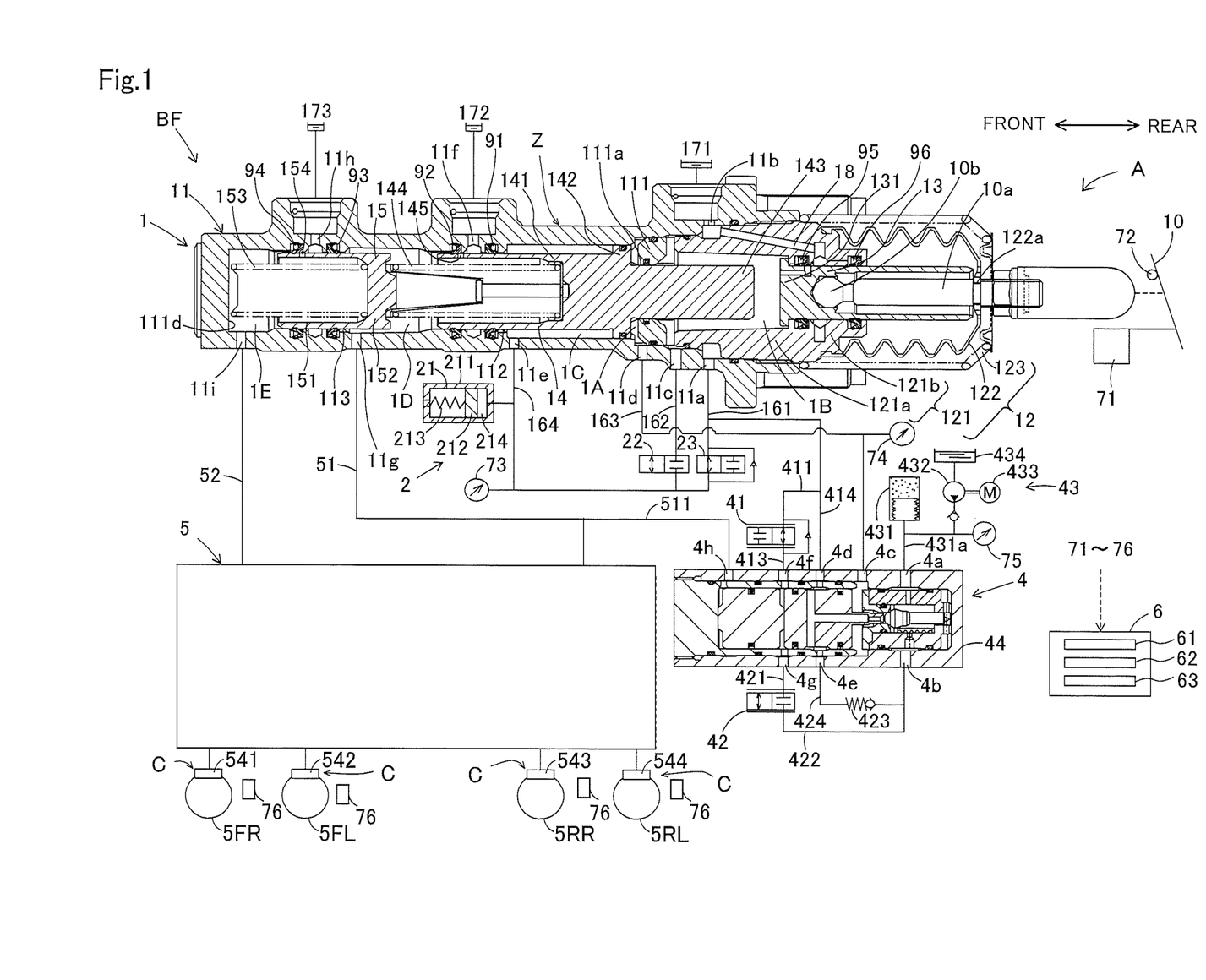
FIG. 1 is a structural view of the braking device for vehicle according to an embodiment of the invention.

The embodiments of the invention will be explained hereinafter with reference to the attached drawings. It is noted that each drawing used for explanation shows a conceptual drawing and the shape of each portion in the drawings does not necessarily indicate an accurate shape in practical use. As shown in FIG. 1, the braking device A for a vehicle according to the embodiment includes a hydraulic pressure braking force generating device BF which generates a hydraulic pressure braking force at vehicle wheels 5FR, 5FL, 5RR and 5RL and a brake ECU 6 which controls the hydraulic pressure braking force generating device BF.

(Hydraulic Pressure Braking Force Generating Device BF)

The hydraulic pressure braking force generating device BF includes as shown in FIG. 1, a master cylinder 1, a reaction force generating device 2, a first control valve 22 (corresponding to electromagnetic valve), a second control valve 23, a servo pressure generating device 4, an actuator 5 wheel cylinders 541 through 544 and various sensors 71 through 76.

(Master Cylinder 1)

The master cylinder 1 is a portion which supplies the actuator 5 with a fluid (an operating fluid) in response to the operating amount of a brake pedal 10 (brake operating member) and includes a main cylinder 11, a cover cylinder 12, an input piston 13, a first master piston 14 and a second master piston 15. The brake pedal 10 may be of any type of brake operating means that can perform brake operation by a driver of the vehicle.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof, penetrating through the inner wall portion 111 in front and rearward direction. The main cylinder 11 is provided therein at portions closer to the front end than the inner wall portion 111 with a small diameter portion 112 (rear) and a small diameter portion 113 (front), each of which inner diameter is set to be slightly smaller than the inner diameter of the inner wall portion 111. In other words, the small diameter portions 112, 113 project from the inner circumferential surface of the main cylinder 11 having an inwardly annularly shaped profile. The first master piston 14 is disposed inside the main cylinder 11 and is slidably movable along the small diameter portion 112 in the axial direction. Similarly, the second master piston 15 is disposed and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end side of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b of the cylindrical portion 121 is formed to be smaller than the inner diameter of the front portion 121a.

The dust prevention purpose boots 122 is of tubular bellow shaped and is extendible or compressible in front and rearward directions. The front side of the boots 122 is assembled to be in contact with the rear end side opening of the cylindrical portion 121. A through hole 122a is formed at a central portion of the rear of the boots 122. The compression spring 123 is a coil shaped biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical portion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. The first master piston 14 is biased in a rear direction by the biasing member 144. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably in fluid-tightly contact with the through hole 111a of the inner wall portion 111. The rear end of the projection portion 143 projects into an inner space of the cylindrical portion 121, passing through the through hole 111a and is separated from the inner peripheral surface of the cylindrical portion 121. The rear end surface of the projection portion 143 is separated from the bottom wall 131 of the input piston 13 and the separation distance is formed to be variable.

It is noted here that a "first master chamber 1D" is defined by the inner peripheral surface of the main cylinder 11, a front side of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, the small diameter portion 112, a front surface of the inner wall portion 111 and the outer peripheral surface of the first master piston 14. The front end portion and the rear end portion of the flange portion 142 of the first master piston 14 separate the rear chamber into a front portion and a rear portion and a "second hydraulic pressure chamber 1C (corresponding to the reaction force chamber)" is defined at the front side of the rear chamber and a "servo chamber (drive chamber) 1A" is defined at the rear side of the rear chamber. The main cylinder 11 and the first master piston 14 form a second hydraulic pressure chamber forming portion Z which forms the second hydraulic pressure chamber 1C. The second hydraulic pressure chamber 1C formed by the second hydraulic pressure chamber forming portion Z decreases the volume thereof by the advance movement of the first master piston 14 and increases the volume thereof by the retreatment movement of the first master piston 14. Further, a "first hydraulic pressure chamber 1B (corresponding to the "separation chamber")" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 13.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. A "second master chamber 1E" is defined by the inner peripheral surface of the main cylinder 11, the inner bottom surface 111d and the second master piston 15.

Ports 11a through 11i, which connect the inside and the outside of the master cylinder 1, are formed at the master cylinder 1. The port 11a is formed on the main cylinder 11 at a location rearward of the inner wall portion 111. The port 11b is formed on the main cylinder 11 opposite to the port 11a in the axial direction at approximately the same location. The port 11a and the port 11b are in communication through an annular space formed between the inner circumferential surface of the main cylinder 11 and the outer circumferential surface of the cylindrical portion 121. The port 11a and the port 11b are connected to a conduit 161 and also connected to a reservoir 171.

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the port 11c and connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

Sealing members, such as O-rings and the like (see black circles indicated in the drawings) are appropriately provided within the master cylinder 1. The sealing members 91 and 92 are provided at the small diameter portion 112 and are liquid-tightly in contact with the outer circumferential surface of the first master piston 14. Similarly, the sealing members 93 and 94 are provided at the small diameter portion 113 and are liquid-tightly in contact with the outer circumferential surface of the second master piston 15. Additionally, sealing members 95 and 96 are provided between the input piston 13 and the cylindrical portion 121.

These sealing members are cup-shaped sealings and each cross-section thereof is formed to be in a C-character.

The stroke sensor 71 is a sensor which detects the operating amount (stroke) of the brake pedal 10 operated by a driver of the vehicle and transmits the detected signal to the brake ECU 6. The brake stop switch 72 is a switch which detects whether the brake pedal 10 is depressed by a driver of the vehicle or not, using a binary signal and the detected signal is sent to the brake ECU 6.

(Reaction Force Generating Device 2)

The reaction force generating device 2 is a device which generates a reaction force against the operation force generated when the brake pedal 10 is depressed. The reaction force generating device 2 is formed mainly by a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein. The piston 212 is biased in the forward side direction by a compression spring 213 and a hydraulic pressure chamber 214 is formed at a location rear side of the piston 212. The hydraulic pressure chamber 214 is connected to the second hydraulic pressure chamber 1C via a conduit 164 and the port 11e, and is connected further to the first control valve 22 and the second control valve 23 via the conduit 164. At least the second hydraulic pressure chamber 1C forms a reaction force chamber which generates the reaction hydraulic pressure. The first hydraulic pressure chamber 1B can be referred to as a separation chamber which separates the first piston 14 and the input piston 13 from each other.

(First Control Valve 22)

The first control valve 22 is an electromagnetic valve which is structured to close under non-energized state (normally closed type electromagnetic valve) and opening and closing operations thereof are controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in sealed state when the first control valve 22 closes. The conduits 164 and 162 are formed for establishing fluid communication between the first hydraulic pressure chamber 1B and the second hydraulic pressure chamber 1C.

The first control valve 22 is closed under non-energized state where an electricity is not applied and under this state, communication between the first hydraulic pressure chamber 1B and the second hydraulic pressure chamber 1C is interrupted. Due to the sealing state of the first hydraulic pressure chamber 1B, the fluid is nowhere to flow and the input piston 13 and the first master piston 14 are moved integrally keeping a constant separation distance therebetween. The first control valve 22 is open under the energized state where an electricity is applied and under such state, the communication between the first hydraulic pressure chamber 1B and the second hydraulic pressure chamber 1C is established. Thus, the volume changes in the first hydraulic pressure chamber 1B and the second hydraulic pressure chamber 1C due to the advancement and retreatment of the first master piston 14 can be absorbed by the transferring of the fluid.

The pressure sensor 73 is a sensor which detects a hydraulic pressure (the reaction force hydraulic pressure) of the second hydraulic pressure chamber 1C and the first hydraulic pressure chamber 1B and is connected to the conduit 164. The pressure sensor 73 detects the pressure of the second hydraulic pressure chamber 1C while the first control valve 22 is in a closed state and also detects the pressure of the first hydraulic pressure chamber 1B while the first control valve 22 is in an open state. The pressure sensor 73 sends the detected signal to the brake ECU 6.

(Second Control Valve 23)

The second control valve 23 is an electromagnetic valve which is structured to open under a non-energized state and the opening and closing operations thereof are controlled by the brake ECU 6. The second control valve 23 is disposed between the conduit 164 and the conduit 161 for establishing fluid communication therebetween. The conduit 164 is in communication with the second hydraulic pressure chamber 1C via the port 11e and the conduit 161 is in communication with the reservoir 171 via the port 11a. Accordingly, the second control valve 23 establishes the communication between the second hydraulic pressure chamber 1C and the reservoir 171 under the non-energized state thereby generating no reaction force hydraulic pressure but the second control valve 23 interrupts the communication therebetween under the energized state thereby generating the reaction force hydraulic pressure.

As explained, the braking device A for a vehicle includes the master cylinder 1 which has the master chamber 1D which generates a master hydraulic pressure by the drive of the first master piston 14, wheel cylinders 541 through 544 which generate hydraulic pressure based on the master hydraulic pressure, the input piston 13 disposed in the master cylinder, defining the first hydraulic pressure chamber 1B filed with the fluid (liquid) with the first master piston 14 and co-operating with the operation of the brake pedal 10, the first control valve 22 which opens or closes the first hydraulic pressure chamber 1B, the second hydraulic pressure chamber 1C in which the reaction force hydraulic pressure is generated in accordance with operation of the brake pedal 10, the second control valve 23 for communicating or interrupting the second hydraulic pressure chamber 1C and the reservoir 173.

(Servo Pressure Generating Device 4)

The servo pressure generating device 4 is formed by a pressure decreasing valve 41, a pressure increasing valve 42, a pressure supplying portion 43 and a regulator 44. The pressure decreasing valve 41 is a valve structured to open under a non-energized state (normally open valve) and the flow-rate (or, the pressure) thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 via the conduits 411 and 161 and ports 11a and 11b. The pressure decreasing valve 41 prevents the fluid in the first pilot chamber 4D from flowing out by valve closing operation, which will be explained later in detail. It is noted here that the reservoirs 171 and 434 or the reservoirs 171 through 173 and 434 are formed by one reservoir. It is also noted that the pressure in the reservoirs 171 through 173 and 434 are the atmospheric pressure. The pressure in the low pressure source (reservoirs 171 through 173 and 434) is set to be lower than the pressure in the pressure source (accumulator 431).

The pressure increasing valve 42 is an electromagnetic valve structured in normally close type and the flow-rate (or pressure) thereof is controlled by the brake ECU 6. One end of the pressure increasing valve 42 is connected to the conduit 421 and the other end thereof is connected to the conduit 422. The pressure supplying portion 43 is a portion which supplies the regulator 44 with mainly a highly pressurized fluid. The pressure supplying portion 43 includes the accumulator 431 (corresponding to the "pressure source"), the pump 432, the motor 433 and the reservoir 434.

The accumulator 431 is a tank in which the highly pressurized fluid is accumulated. The accumulator 431 is connected to the regulator 44 and the pump 432 through the conduit 431a. The pump 432 is driven by the motor 433 and supplies the fluid which has been reserved in the reservoir 434 to the accumulator 431. The pressure sensor 75 provided in the conduit 431a detects the accumulator hydraulic pressure in the accumulator 431 and sends the detected signal to the brake ECU 6. The accumulator hydraulic pressure correlates with the accumulated fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 pumps the fluid to the accumulator 431 thereby to recover a pressure up to the value equal to or more than the predetermined value (predetermined pressure). The holding hydraulic pressure of the accumulator 431 can be set to the predetermined value.

Figure 2:
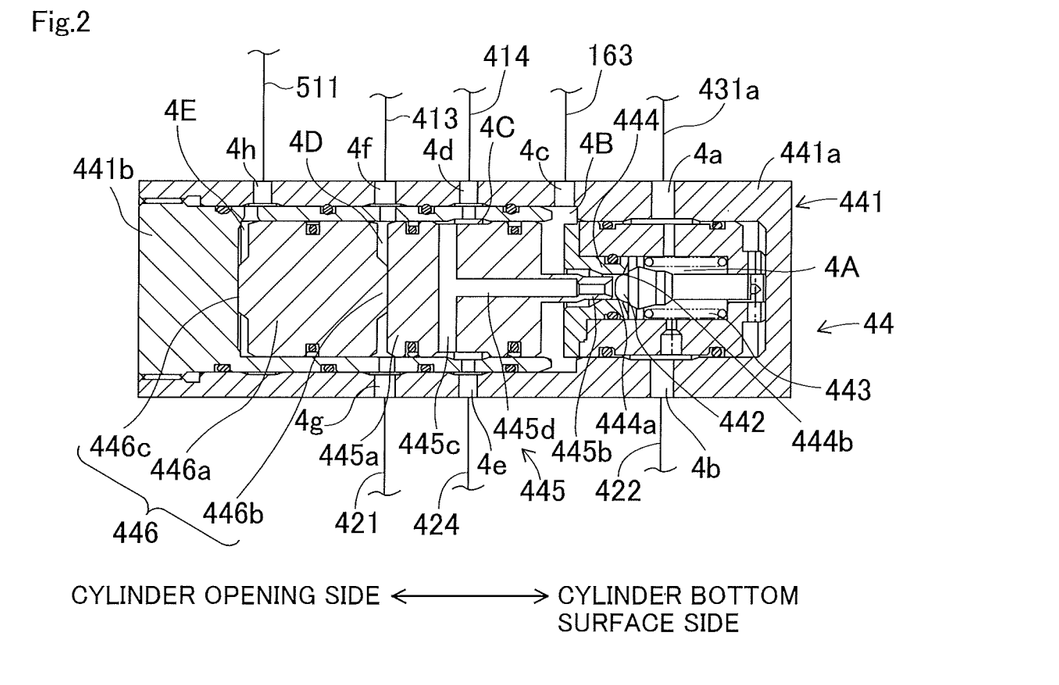
FIG. 2 is a cross sectional view of a regulator according to the embodiment.

The regulator 44 (pressure adjusting device) includes a cylinder 441, a ball valve 442, a biasing portion 443, a valve seat portion 444, a control piston 445 and a sub-piston 446 as shown in FIG. 2. The cylinder 441 includes a cylinder case 441a formed in a substantially bottomed cylinder-shape having a bottom surface at one end thereof (at the right side in FIG. 2) and a cover member 441b closing an opening of the cylinder case 441a (at the left side thereof in FIG. 2). The cylinder case 441a is provided with a plurality of ports 4a through 4h through which the inside and the outside of the cylinder case 441a are in communication. The cover member 441b is formed in a substantially bottomed cylinder-shape having a bottom surface and is provided with a plurality of ports which is arranged at positions facing to the respective cylindrical ports 4d through 4h provided on the cylindrical portion.

The port 4a is connected to the conduit 431a. The port 4b is connected to the conduit 422. The port 4c is connected to a conduit 163. The conduit 163 connects the servo chamber 1A and the outlet port 4c. The port 4d is connected to the conduit 161 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51.

The ball valve 442 is a valve having a ball shape and is arranged at the bottom surface side (which will be hereinafter referred to also as a cylinder bottom surface side) of the cylinder case 441a inside the cylinder 441. The biasing portion 443 is formed by a spring member biasing the ball valve 442 towards the opening side (which will be hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder inside into two parts, the cylinder opening side and the cylinder bottom surface side. A through passage 444a, through which the cylinder opening side and the cylinder bottom surface side spaces are in communication, is formed at a central portion of the valve seat portion 444. The valve member 444 holds the ball valve 442 from the cylinder opening side in a manner that the biased ball valve 442 closes the through passage 444a. A valve seat surface 444b is formed at the opening of the cylinder bottom surface side of the through passage 444a and the ball valve 442 is detachably seated on (in contact with) the valve seat surface 444b.

A space defined by the ball valve 442, the biasing portion 443, the valve seat portion 444 and the inner circumferential surface of the cylinder case 441a at the cylinder bottom surface side is referred to as a "first chamber 4A". The first chamber 4A is filled with the fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a diameter smaller than the diameter of the main body portion 445a. The main body portion 445a is arranged in the cylinder 441 in a coaxial and liquid-tight manner on the cylinder opening side of the valve seat portion 444, the main body portion 445a being slidably movable in an axial direction. The main body portion 445a is biased towards the cylinder opening side by means of a biasing member (not shown). A passage 445c is formed at a substantially intermediate portion of the main body portion 445a in a cylinder axis direction. The passage 445c extends in the radial direction (in an up-and-down direction as viewed in the drawing) and both ends of the passage 445c are open to the circumferential surface of the main body portion 445a. A portion of an inner circumferential surface of the cylinder 441 corresponding to an opening position of the passage 445c is provided with the port 4d and is recessively formed. The recessed space portion forms a "third chamber 4C".

The projection portion 445b projects towards the cylinder bottom surface side from a center portion of an end surface of the cylinder bottom surface side of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side by a predetermined distance. A passage 445d is formed at the projection portion 445b so that the passage 445d extends in the cylinder axis direction and opens at a center portion of an end surface of the projection portion 445b. The passage 445d extends into the inside of the main body portion 445a and is connected to the passage 445c.

A space defined by the end surface of the cylinder bottom surface side of the main body portion 445a, an outer peripheral surface of the projection portion 445b, the inner circumferential surface of the cylinder 441, the valve seat portion 444 and the ball valve 442 is referred to as a "second chamber 4B". The second chamber 4B is in communication with the ports 4d and 4e via the passages 445d and 445c and the third chamber 4C, in a state in which the protruding portion 445 b and the ball valve 442 are not in contact with each other.

The sub-piston 446 includes a sub main body portion 446a, a first projection portion 446b and a second projection portion 446c. The sub main body portion 446a is formed in a substantially columnar shape. The sub main body portion 446a is arranged within the cylinder 441 in a coaxial and liquid-tight manner on the cylinder opening side of the main body portion 445a. The sub main body portion 446a is slidably movable in the axial direction.

The first projection portion 446b is formed in a substantially columnar shape having a diameter smaller than the diameter of the sub main body portion 446a and projects from a center portion of an end surface of the cylinder bottom surface side of the sub main body portion 446a. The first projection portion 446b is in contact with the end surface of the cylinder opening surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D". The first pilot chamber 4D is in communication with the pressure decreasing valve 41 via the port 4f and the conduit 413 and is in communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the fluid. The pressure sensor 74 is a sensor that detects a hydraulic pressure (the hydraulic pressure of the servo chamber 1A: the servo pressure) to be supplied to the servo chamber 1A and is connected to the conduit 163. The pressure sensor 74 sends the detected signal to the brake ECU 6. The detected value of the pressure sensor 74 is an actual value of the servo pressure (corresponding to the drive hydraulic pressure) and is referred to as the "actual servo pressure (actual hydraulic pressure).

As explained, the regulator 44 includes the control piston 445 which is driven by the difference between the force corresponding to the pressure (referred to also as "pilot pressure") in the first pilot chamber 4D and the force corresponding to the servo pressure and the volume of the first pilot chamber 4D changes in response to the movement of the control piston 445 and the more the liquid flowing into or out of the first pilot chamber 4D increases, the more the amount of the movement of the control piston 445 with reference to the position of the control piston 445 in an equilibrium state increases. The equilibrium state is a state that the force corresponding to the pilot pressure balances with the force corresponding to the servo pressure increases. Thus, the flowing amount of the liquid flowing into or out of the servo chamber 1A is structured to be increasing.

The regulator 44 is structured so that the more the flowing amount of the liquid flowing into the first pilot chamber 4D from the accumulator 431 increases, the larger the volume of the first pilot chamber 4D becomes and at the same time the more the flowing amount of the liquid flowing into the servo chamber 1A from the accumulator 431 increases and further, the more the flowing amount of the liquid flowing out from the first pilot chamber 4D into the reservoir 171 increases, the smaller the volume of the first pilot chamber 4D becomes and at the same time the more the flowing amount of the liquid flowing out of the servo chamber 1A into the reservoir 171 increases.

Further, the control piston 445 is provided with a damper device (not shown) at the wall portion facing to the first pilot chamber 4D. The damper device is structured as a stroke simulator and includes a piston portion which is biased towards the first pilot chamber 4D by a biasing member. By this provision of the damper device, the rigidity of the first pilot chamber 4D is variable in response to the pilot pressure.

(Actuator 5)

The actuator 5 is provided between the first and the second master chamber 1D, 1E which generate the master cylinder hydraulic pressure and the wheel cylinders 541 through 544. The actuator 5 and the first master chamber 1D are in communication through the conduit 51 and the actuator 5 and the second master chamber 1E are in communication through the conduit 52. The actuator 5 adjusts the brake hydraulic pressure to be supplied to the wheel cylinders 541 through 544 based on the instructions from the brake ECU 6. The actuator 5 according to the embodiment forms an anti-lock brake system (ABS). The actuator 5 is formed with four channel system (dual circuitry system) corresponding to the respective wheel cylinders 541 through 544. The structure of the actuator 5 is a well-known type and the detail explanation thereof will be omitted.

(Brake ECU 6)

The brake ECU 6 is an electronic control unit and includes a microcomputer. The microcomputer includes an input/output interface, CPU, RAM, ROM and a memory portion such as non-volatile memory, connected with one another through bus communication. The brake ECU 6 is connected to the various sensors 71 through 76 for controlling each of the electromagnetic valves 22, 23, 41 and 42, the motor 433 and the actuator 5 and so on. Information of the operating amount (stroke amount) of brake pedal 10 operated by the operator of the vehicle is inputted to the brake ECU 6 from the stroke sensor 71, a detecting signal, which shows whether or not the operation of the brake pedal 10 by the operator of the vehicle is performed, is inputted to the brake ECU 6 from the brake stop switch 72, information of the reaction force hydraulic pressure of the second hydraulic pressure chamber 1C or the pressure of the first hydraulic pressure chamber 1B is inputted to the brake ECU 6 from the pressure sensor 73, information of the actual servo pressure supplied to the servo chamber 1A is inputted to the brake ECU 6 from the pressure sensor 74, information of the accumulator hydraulic pressure of the accumulator 431 is inputted to the brake ECU 6 from the pressure sensor 75 and information of each wheel speed of the respective vehicle wheels 5FR, 5FL, 5RR and 5RL is inputted to the brake ECU 6 from each of the wheel speed sensors 76.

(Brake Control)

The brake control by the brake ECU 6 (normal brake control) will be explained hereinafter. The normal brake control is performed by normally controlling the hydraulic pressure braking force. In the brake control (first operating mode), the brake ECU 6 energizes the first control valve 22 and opens the first control valve 22 and energizes the second control valve 23 and closes the second control valve 23. By this closing of the second control valve 23, the communication between the second hydraulic pressure chamber 1C and the reservoir 171 is interrupted and by the opening of the first control valve 22, the communication between the first hydraulic pressure chamber 1B and the second hydraulic pressure chamber 1C is established. Thus, the brake control is a mode for controlling the servo pressure of the servo chamber 1A by controlling the pressure decreasing and pressure increasing valves 41 and 42 under the first control valve 22 being opened and the second control valve 23 being closed. The pressure decreasing valve 41 and the pressure increasing valve 42 is a valve device which adjusts the flow-rate of the fluid which flows into or out of the first pilot chamber 4D. Under this brake control, the brake ECU 6 calculates a required braking force required by the driver of the vehicle based on the operating amount of the brake pedal 10 detected by the stroke sensor 71 (displacement amount of the input piston 13) or the operating force of the brake pedal 10 (for example, the hydraulic pressure detected at the pressure sensor 73). Then, based on the calculated required braking force, the brake ECU 6 sets a target servo pressure (target hydraulic pressure) which is the target value of the servo pressure. The pressure decreasing valve 41 and the pressure increasing valve 42 are controlled so that the actual servo pressure approximates the target servo pressure.

In more detail, under the state that the brake pedal 10 is not depressed, the brake control state becomes the state as explained above, i.e., becomes the state that the ball valve 442 closes the through passage 444a of the valve seat portion 444. Under this state, the pressure decreasing valve 41 is in an open state and the pressure increasing valve 42 is in a closed state. In other words, the fluid communication between the first chamber 4A and the second chamber 4B is interrupted. The second chamber 4B is in communication with the servo chamber 1A via the conduit 163 to keep the hydraulic pressures in the two chambers 4B and 1A to be mutually in an equal level. The second chamber 4B is in communication with the third chamber 4C via the passages 445c and 445d of the control piston 445. Accordingly, the second chamber 4B and the third chamber 4C are in communication with the reservoir 171 via the conduits 414 and 161. One side of the first pilot chamber 4D is closed by the pressure increasing valve 42, while the other side thereof is connected to the reservoir 171 via the pressure decreasing valve 41. The pressures of the first pilot chamber 4D and the second chamber 4B are kept to the same pressure level. The second pilot chamber 4E is in communication with the first master chamber 1D via the conduits 511 and 51 thereby keeping the pressure level of the two chambers 4E and 1D to be mutually equal to each other.

From this state, when the brake pedal 10 is depressed, the brake ECU 6 controls the pressure decreasing valve 41 and the pressure increasing valve 42 based on the actual servo pressure and the target servo pressure. The brake ECU 6 controls the pressure decreasing valve 41 to close and the pressure increasing valve 42 to open upon pressure increase control. When the pressure increasing valve 42 is opened, a communication between the accumulator 431 and the first pilot chamber 4D is established. When the pressure decreasing valve 41 is closed, a communication between the first pilot chamber 4D and the reservoir 171 is interrupted. The pressure in the first pilot chamber 4D can be raised by the highly pressurized fluid supplied from the accumulator 431. By the increase of the pressure in the first pilot chamber 4D, the control piston 445 slidably moves towards the cylinder bottom surface side. Then the tip end of the projecting portion 445b of the control piston 445 is brought into contact with the ball valve 442 to close the passage 445d by the ball valve 442. Thus, the fluid communication between the second chamber 4B and the reservoir 171 is interrupted.

By further slidable movement of the control piston 445 towards the cylinder bottom surface side, the ball valve 442 is pushed towards the cylinder bottom surface side by the projection portion 445b to thereby separate the ball valve 442 from the valve seat surface 444b. This will allow establishment of fluid communication between the first chamber 4A and the second chamber 4B through the through passage 444a of the valve seat portion 444. As the highly pressurized fluid is supplied to the first chamber 4A from the accumulator 431, the hydraulic pressure in the second chamber 4B is also increased by the communication therebetween. It is noted that the more the separated distance of the ball valve 442 from the valve seat surface 444b becomes large, the more the fluid passage for the fluid becomes large and accordingly, the flow-rate of the fluid in the fluid passage downstream of the ball valve 442 becomes high.

The brake ECU 6 controls the pressure increase valve 42 and closes the pressure reducing valve 41 so that the larger the movement amount of the input piston 13 (operation amount of the brake pedal 10) detected by the stroke sensor 71, the higher the pilot pressure becomes. In other words, the larger the displacement amount of the input piston 13 (operating amount of the brake pedal 10), the higher the pilot pressure becomes and accordingly, the higher the servo pressure becomes. The servo pressure can be obtained from the pressure sensor 74 and can be converted into the pilot pressure.

As the pressure increase of the second chamber 4B, the pressure in the servo chamber 1A which is in fluid communication with the second chamber 4B increases. By the pressure increase in the servo chamber 1A, the first master piston 14 advances forward and the pressure (master hydraulic pressure) in the first master chamber 1D increases. Then the second master piston 15 advances forward also and the pressure (master hydraulic pressure) in the second master chamber 1E increases. By the increase of the pressure in the first master chamber 1D, highly pressurized fluid is supplied to the actuator 5 and the second pilot chamber 4E. The pressure in the second pilot chamber 4E increases, but since the pressure in the first pilot chamber 4D is also increased, the sub piston 446 does not move. Thus, the highly pressurized (master hydraulic pressure) fluid is supplied to the actuator 5 and a friction brake is operated to control brake operation of the vehicle. When the brake operation is released, as opposite to the above, the pressure decreasing valve 41 is open and the pressure increasing valve 42 is closed to establish the fluid communication between the reservoir 171 and the first pilot chamber 4D. Then, the control piston 445 retreats and the vehicle returns to the state before depression of the brake pedal 10. It is noted that when the braking device A for a vehicle includes a drive piston (output piston) which drives the first master piston 14, such drive piston may be used as the piston which drives the servo pressure.

(Operating Mode)

The braking device A for a vehicle includes, as the operating mode, a first operating mode and a second operating mode. The brake ECU 6 can switch over the operating mode between the first and the second operating modes. In other words, the brake ECU 6 can select one of the first and the second operating modes as the operating mode.

The first operating mode is a mode for driving the first master piston 14 by the servo pressure based on the hydraulic pressure of the accumulator 431 in response to the detection result (for example, the stroke and/or the reaction force hydraulic pressure) of the brake operation by the driver of the vehicle. In other words, in the first operating mode, the normal brake control as described above is performed. In the first operating mode, the first control valve 22 is in an open state and the second control valve 23 is in a closed state.

The second operating mode is a mode for mechanically transmitting the brake operation by the driver of the vehicle up to the first master piston 14. In more detail, in the second operating mode, the first control valve 22 is in a closed state and the second control valve 23 is in an open state. Further, the first hydraulic pressure chamber 1B is in a sealed state and the second hydraulic pressure chamber 1C is in a fluid communication state with the reservoir 171. Under this state, when the brake pedal 10 is operated, due to the sealed state of the first hydraulic pressure chamber 1B, the first master piston 14 is mechanically co-operated with the advance movement of the input piston 13 and advances integrally with the input piston 13 (in mutually non-contact state). At this time, since the second hydraulic pressure chamber 1C is in communication with the reservoir 171, the stroke simulator 21 does not function and substantially no reaction force hydraulic pressure is generated. The master hydraulic pressure generated by the advance movement of the first master piston 14 is supplied to the actuator 5 and the second pilot chamber 4E via the conduits 51, 52 and 511. Thus, according to the second operating mode, the master hydraulic pressure and the braking force can be generated only by the operation of the brake pedal 10.

(Operating Mode Switching Control)

The brake ECU 6, as a function, includes a control portion 61, a fade judging portion 62 and an operation judging portion 63. The control portion 61 executes the brake control under the first operating mode and executes the switching over operation of the operating mode (selecting the second operating mode) under a predetermined condition. The switching over operation of the operating mode will be explained in detail later. It is noted that the vehicle is equipped with a friction brake device C and the friction brake device C is provided at each wheel 5FR, 5FL, 5RR and 5RL and is mainly formed by the wheel cylinders 541 through 544 and the brake pads (not shown) and the brake discs (not shown).

The fade judging portion 62 judges whether the vehicle state (for example, the state of the hydraulic pressure braking force generating device BF or the state of the friction brake device C) is in a fade state or not. The fade state means that the temperature of brake pad becomes too high to demonstrate a desired braking force and the fade state according to the embodiment includes a highly probable state that the desired braking force cannot be demonstrated due to the high temperature of the brake pad. The fade judging portion 62 judges the fade state according to a well-known judging method. For example, as shown in the Patent Publication JP2009-190475 A, the brake ECU 6 calculates the workload from the friction force generated between the brake disc and the brake pad and the rotation amount of the brake disc and then presumes the pad temperature from the workload obtained above and the cooling model of the brake pad. Based on the presumed pad temperature, for example, when the brake pad temperature is equal to or higher than a predetermined value, the fade condition of the friction brake device C is judged to be established. It is noted that the rotation amount of the brake disc may be detected by the wheel speed sensor 76. As an alternative, as shown in the Patent Publication JP2002-193090 A, the fade condition of the friction brake device C may be judged based on the vehicle deceleration calculated from the vehicle wheel sensor 76 and the operating amount or the operating force detected by the stroke sensor 71 or the pressure sensor 73. As explained the fade judging portion 62 judges whether the fade condition is established or not by using a well-known method.

The operation judging portion 63 judges, in a brake stage having an increasing stage where an operating amount of the brake operation by the driver of the vehicle increases from a value of zero and a decreasing stage where the operating amount decreases to the value of zero, whether or not the operating amount in the increasing stage is equal to or more than a predetermined threshold amount or whether or not an increasing speed of the operating amount in the increasing stage is equal to or more than a predetermined threshold speed. It is preferable to set the predetermined threshold amount to the operating amount or less, at which amount the actual servo pressure reaches to the hydraulic pressure corresponding to the hydraulic pressure of the accumulator 431 (maximum value of the servo pressure) in the first operating mode, in view point of suppression of generation of the ineffective operation. In other words, from the view point of suppression of generation of the ineffective operation, the predetermined threshold amount is preferably set to the operating amount or less where the actual servo pressure becomes the assisting limit (maximum value) in the normal brake control. In the increasing stage, when the actual servo pressure reaches to the hydraulic pressure corresponding to the assisting limit, an ineffective operation is generated which does not increase the actual servo pressure (and eventually the master hydraulic pressure) in response to the increase of the operating amount in the first operating mode. To this, generation of the ineffective operating amount can be prevented by switching over the operating mode in the increasing stage from the first operating mode to the second operating mode before the actual servo pressure reaches to the hydraulic pressure corresponding to the assisting limit.

It is noted here that the predetermined threshold amount according to the embodiment is set to the operating amount where the actual servo pressure becomes the assisting limit in the normal brake control. The operation judging portion 63, regarding to the operating amount, judges whether the detected value of the stroke sensor 71 is equal to or more than the predetermined threshold amount or not, or whether the detected value of the pressure sensor 74 is a, value corresponding to the hydraulic pressure of the accumulator 431 or not. The hydraulic pressure of the accumulator 431 as the reference to the judgement is a predetermined value (predetermined pressure) set in advance. However, the detected value of the pressure sensor 75 can be also adopted.

Further, the control portion 61 calculates the increasing speed of the operating amount (change amount of the operating amount per unit time) and compares the calculated result with the predetermined threshold speed. The predetermined threshold speed can be randomly set and according to this embodiment, such predetermined threshold speed is presumed to be the speed at a sudden braking (for example, the operating speed where the actual servo pressure reaches to the assisting limit). It is noted that in the first operating mode, the operating amount and the increasing speed are convertible into the operating force (depression force) from the relationship between the reaction force hydraulic pressure and the operating amount. The operating amount and the increasing speed may be calculated based on the operating force (such as the detection value of the pressure sensor 73). The operating amount may a concept widely including the operating force and the predetermined threshold amount and the predetermined threshold speed may be set based on the operating force. It is noted here that hereinafter in one brake stage, the timing that the operating amount is judged to be equal to or more than the predetermined threshold amount by the operation judging portion 63 is referred to as the "first timing" and the timing that the increasing speed of the operating amount is judged to be equal to or more than the predetermined threshold speed by the operation judging portion 63 is referred to as the "second timing".

The control portion 61 obtains the judging result from the fade judging portion 62 and the operation judging portion 63. The control portion 61 selects the first operating mode as the operation mode, at least from the time the increasing stage starts until the first timing or the second timing and in the increasing stage after the first timing or the second timing, selects the second operating mode as the operating mode at the same time maintain the actual servo pressure of the time of the selection. The actual servo pressure at least in the first timing corresponds to the maximum value (assisting limit) of the servo pressure in the brake control. Further, the control portion 61 according to the embodiment executes switching over operation of the operating mode to the second operating mode on the premise that the vehicle state is judged to be in the fade state by the fade judging portion 62. In other words, the control portion 61 switches over the operating mode to the second operating mode when the vehicle state is judged to be in the fade state by the fade judging portion 62 and at the same time when the operating amount is judged to be equal to or more than the predetermined threshold amount by the operation judging portion 63 or when increasing speed of the operating amount is judged to be equal to or more than the predetermined threshold speed by the operation judging portion 63. The control portion 61 according to the embodiment switches over the operating mode to the second operating mode upon the first timing or the second timing under the circumstance that was judged the vehicle is in the fade state.

Figure 3:
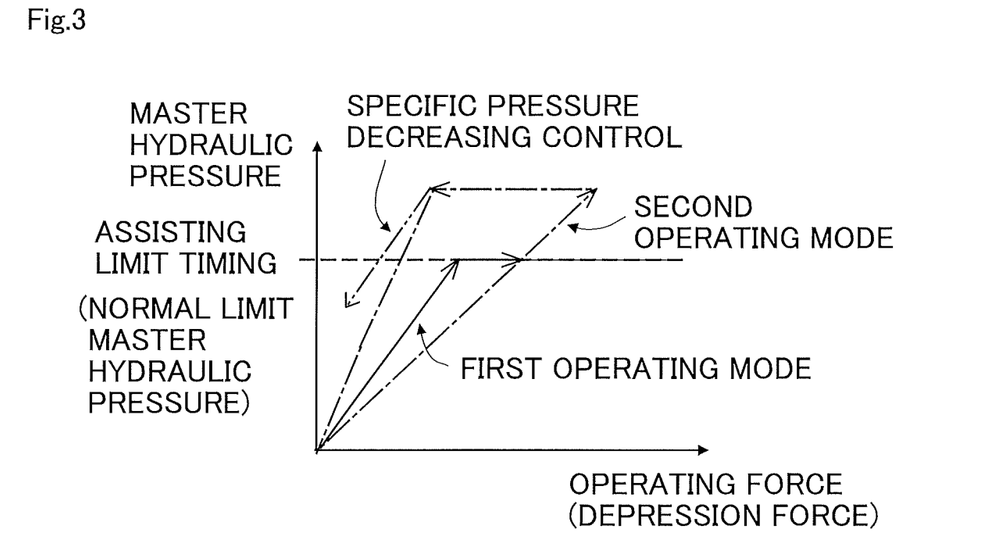
FIG. 3 is an explanatory view explaining an example of the operating mode according to the embodiment.

FIG. 3 shows the relationship between the operating force (depression force) to the brake pedal 10 and the master hydraulic pressure in the respective operating modes. The solid line indicates the relationship between operating force and the master hydraulic pressure in the first operating mode and the dot-chain line indicates the relationship therebetween in the second operating mode. Further, the two-dot-chain line indicates the relationship therebetween in the specific pressure decreasing control, which will be explained later. As shown in FIG. 3, when the fade condition is established and the actuals servo pressure becomes the assisting limit, the operating mode is switched over from the first to the second operating mode. Then, the master hydraulic pressure increases to equal to or more than the assisting limit pressure, in response to the increase of the operating force. It is noted here that the timing of the switching over (switching over timing) of the operating mode is set to any time after the first timing or the second timing and is not necessarily set to the same timing to the first timing or the second timing. The switching over timing can be set depending on a predetermined condition (such as, for example, the detection result of the fade judgement) or various settings (such as, for example, at a timing a predetermined time after the first timing, or the like).

It is noted that in the first operating mode, the predetermined threshold amount may be set to an amount equal to or more than the operating amount which reaches to the assisting limit. If the first operating mode is desired to be executed at least until the time the actual servo pressure reaches to the assisting limit, this setting is effective. Further, when the master hydraulic pressure at the assisting limit timing in the first operating mode is referred to as the "normal limit master hydraulic pressure" (See FIG. 3), the predetermined threshold amount may be set, for example, to the operating force or the operating amount corresponding thereto at the time the master hydraulic pressure reaches to the normal limit master hydraulic pressure in the second operating mode. In other words, the predetermined threshold amount may be set to the operating amount corresponding to the operating force necessary for reaching to the normal limit master hydraulic pressure in the second operating mode.

The control portion 61 controls the first control valve 22 to be in a closed state and the second control valve 23 to be in an open state and at the same time controls the pressure decreasing valve 41 and the pressure increasing valve 42 to be in a closed state upon selecting the second operating mode. The closing control of the pressure decreasing valve 41 and the pressure increasing valve 42 in this situation is referred to as the "specific holding control". According to the embodiment, the "specific holding control" may be said also as the holding control in fade state. The brake operation by the driver of the vehicle is mechanically transmitted to the first master piston 14 by liquid-tightly sealing the first hydraulic pressure chamber 1B and at the same time opening the second hydraulic pressure chamber 1C to the reservoir 171. Further, the first pilot chamber 4D is liquid-tightly sealed by execution of the specific holding control by the control portion 61 to close the pressure decreasing valve 41 and the pressure increasing valve 42 and the actual servo pressure can be maintained to the pressure at the time of assisting limit by maintaining the pilot pressure. In the specific holding control according to the embodiment, maintaining the actual servo pressure to the pressure upon the selection of the second operating mode is the same in meaning of maintaining the actual servo pressure (corresponding to the pressure at the assisting limit) in the first timing.

Further, in the decreasing stage of the brake stage in which the second operating mode is selected in the increasing stage thereof, the control portion 61 selects the second operating mode at the same time controls the actual servo pressure such that the smaller the operating amount in the decreasing stage, the smaller the actual servo pressure becomes. Thus, once the control portion 61 selects the second operating mode in one brake stage, the control portion 61 consecutively selects the second operating mode in the decreasing stage of the one brake stage. In other words, the control portion 61 does not switch over the operating mode from the second operating mode to the first operating mode during one brake stage.

Then, the control portion 61 controls to open the pressure decreasing valve 41 so that the smaller the operating amount, the smaller the actual servo pressure becomes in the decreasing stage. In more detail, the control portion 61 judges whether the brake pedal 10 releasing operation (stroke in a rearward direction) is performed or not, i.e., whether the brake stage is in the decreasing stage or not based on the detection result of the stroke sensor 71. When the control portion 61 judges that the brake stage is in the decreasing stage, once reduces the control current of the pressure decreasing valve 41 to the valve opening current and thereafter reduces the control current from the valve opening current in response to the releasing operating amount or the decreasing speed of the operating amount. It is noted that the relationship between the feed-forward control current (hereinafter, referred to as "FF control current") to the pressure decreasing valve 41 under releasing operation and the operating amount is a linear relation wherein the smaller the operating amount, the smaller the FF control current becomes.

It is noted here that the control portion 61 can output the control current, in which an opening/closing hysteresis of the pressure decreasing valve 41 has been considered, to the pressure decreasing valve 41. The pressure decreasing valve 41 has, as a characteristic of the valve opening current, a characteristic that the flow-rate is different between the valve opening operation and the valve closing operation with respect to the same control current value. The control portion 61, as the control current to the pressure decreasing valve 41 under the pressure decreasing stage, can apply a hysteresis-considered control current which corresponds to the FF control current to or from which a hysteresis-considered current is added or subtracted.

Further, the control portion 61 controls the decreasing speed of the actual servo pressure such that the smaller the decreasing speed of the operating amount in the decreasing stage, the smaller the decreasing speed of the actual servo pressure becomes. In other words, the control portion 61 controls such that the slower the releasing speed of the operation of the driver of the vehicle, the smaller the decreasing width of the control current becomes and also the slower the pressure decreasing speed becomes. The control portion 61 uses the above hysteresis-considered control current as the control current when for example, the decreasing speed of the operating amount is equal to or less than the predetermined speed and can ease up the pressure decreasing speed of the actual servo pressure.

Still further, when the control portion 61 judges that the brake stage is in decreasing stage, the control portion 61 starts measurement of the elapsed time of decreasing stage by incrementing the counter while the stage is being judged to be the decreasing stage. The control portion 61 calculates a target discharge flow-rate by multiplying the discharge flow-rate discharged from the first pilot chamber 4D per unit time which corresponds to the targeting pressure decreasing amount by the elapsed time (counter). The control portion 61 compares the current discharge flow-rate with the target discharge flow-rate every predetermined time and when the current discharge flow-rate is smaller than the target discharge flow-rate, the control portion 61 controls the pressure decreasing valve 41 so that the flow-rate of the pressure decreasing valve 41 becomes the target discharge flow-rate. The pressure decreasing control after the selection of the second operating mode as explained above is referred to as the "specific pressure decreasing control" (in this embodiment, it can also be said to be a pressure decreasing control in fade state).

When the releasing operation stops in the decreasing stage, the control portion 61 detects the operation stop (maintaining of the operating amount), based on the detected value of the stroke sensor 71. When the operation stop is detected, the control portion 61 closes the pressure decreasing valve 41 (and the pressure increasing valve 42) so that the pilot pressure is maintained. In other words, under such state, the control portion 61 outputs the holding current to the pressure decreasing valve 41 as the control current.

When the operating amount is zero in the decreasing stage, the control portion 61 presumes that the brake stage ended and switches over the operating mode from the second to the first operating mode. Upon such switching over operation of the operating mode, the control portion 61 controls the second control valve 23 to be switched from the open state to the closed state and thereafter controls the first control valve 22 to be switched from the closed state to the open state.

Figure 4:
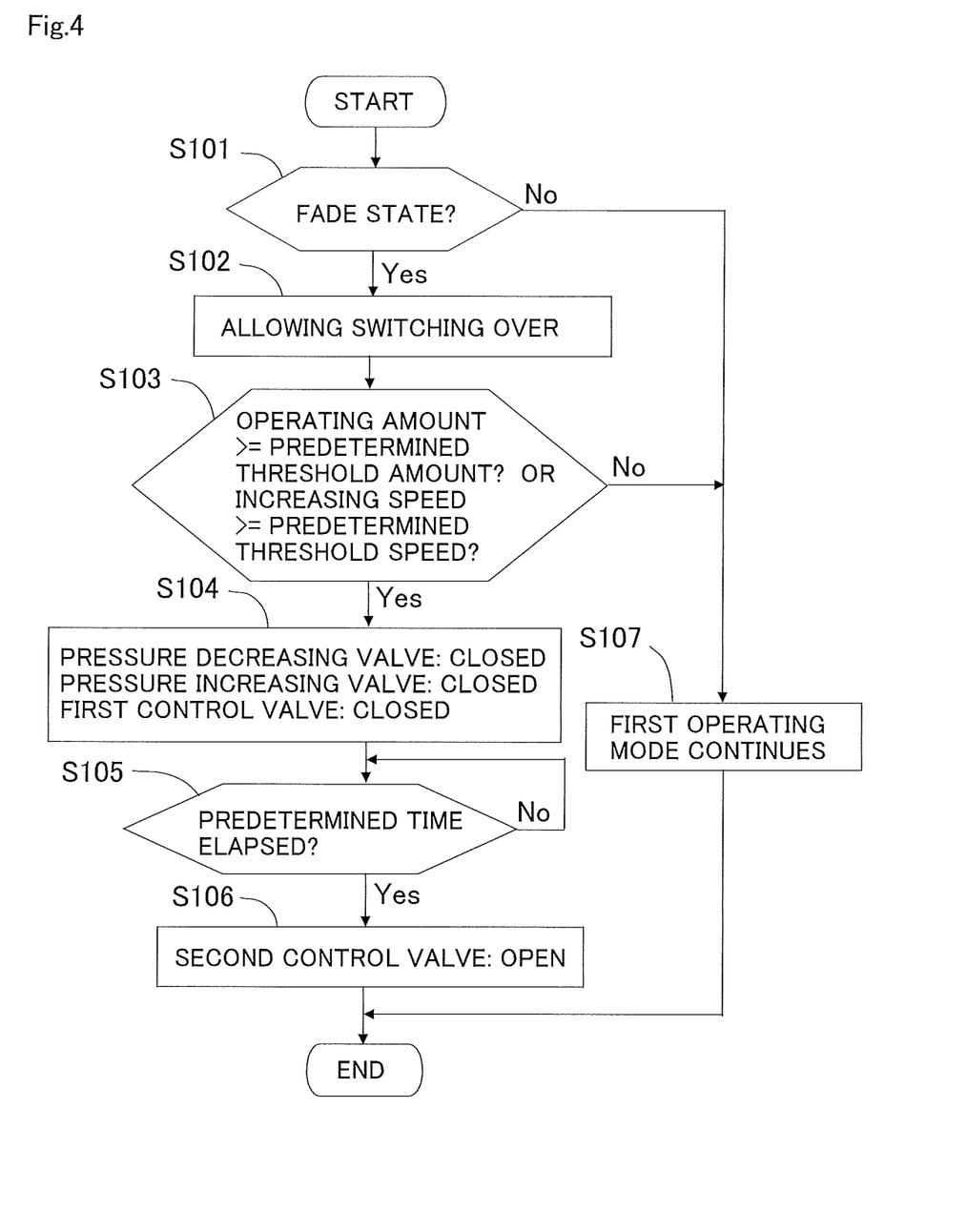
FIG. 4 is a flowchart explaining a flow of a switching over of the operating mode according to the embodiment.
Figure 5:
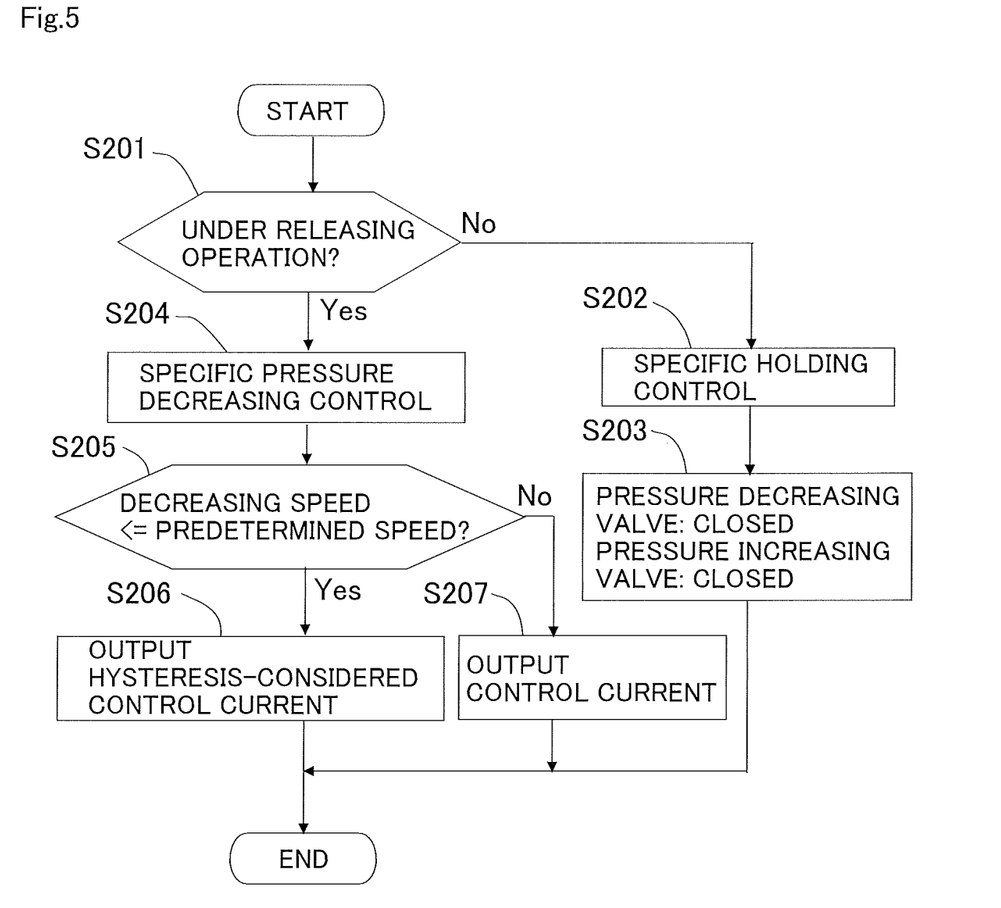
FIG. 5 is a flowchart explaining a flow of a control of the switching over of the operating mode according to the embodiment.

The flow of switching over operation of the operating mode and the control after the switching over operation by the brake ECU 6 will be explained with reference to FIGS. 4 and 5. As shown in FIG. 4, the fade judging portion 62 judges whether the vehicle state is in a fade state or not, i.e., whether the fade condition is established or not (S101). When the vehicle state is judged to be in the fade state (S101: Yes), the control portion 61 executes the control in fade state, i.e., allows the switching over operation to the second operating mode (S102). The operation judging portion 63 judges whether the operating amount is equal to or more than the predetermined threshold amount or not (whether the actual servo pressure is equal to or more than the predetermined value or not), or whether the increasing speed of the operating amount is equal to or more than the predetermined threshold speed or not (S103). Under the switching over operation being in allowable state, if the operating amount is equal to or more than the predetermined threshold amount, or if the increasing speed is equal to or more than the predetermined threshold speed (S103: Yes), the control portion 61 switches over the operating mode from the first operating mode to the second operating mode (S104 through S106).

In more detail, the control portion 61 executes the specific holding control, i.e., outputs the holding current to the pressure decreasing valve 41 to close the pressure decreasing valve 41 and at the same time to reduce the control current to the pressure increasing valve 42 to zero to thereby close the pressure increasing valve 42 and at the same time closes the first control valve 22 (S104). Then, after the predetermined time passed since the closure of the first control valve 22 (S105: Yes), the control portion 61 opens the second control valve 23 (S106). Thus, the first pilot chamber 4D is liquid-tightly sealed to maintain the actual servo pressure and the operating mode is switched over from the first operating mode to the second operating mode. It is noted however, when the fade condition is not established, (S101: No) or the operating amount is less than the predetermined threshold amount and the increasing speed is less than the predetermined threshold speed (S103: No), the first operating mode continues (S107).

The switching over control will be explained hereinafter with reference to FIG. 5. As shown in FIG. 5, the control portion 61 judges whether the brake operation is under releasing operation of the brake pedal 10 or not (i.e., whether the decreasing stage or not) (S201). If the brake operation is not under releasing operation of the brake pedal 10 (S201: No), the control portion 61 continuously executes the specific holding control (S202) to have the pressure decreasing valve 41 and the pressure increasing valve 42 to be in the closed state (S203). On the other hand, if the brake operation is under the releasing operation (S201: Yes), the control of the control portion 61 is shifted to the specific pressure decreasing control from the specific holding control (S204). The control portion 61 judges whether the decreasing speed of the operating amount is equal to or less than the predetermined speed or not based on the detected value of the stroke sensor 71 (S205). When the decreasing speed is equal to or less than the predetermined speed (S205: Yes), the control portion 61 outputs the hysteresis-considered control current (FF control current+hysteresis-considered current) to the pressure decreasing valve 41 (S206). On the other hand, when the decreasing speed is more than the predetermined speed (S205: No), the control portion 61 outputs the control current (FF control current) to the pressure decreasing valve 41 (S207).

According to the embodiment, as the operating mode, the first operating mode is selected until reaching to the assisting limit or until a sudden brake operation is performed (i.e., in normal area) and accordingly, the normal brake operation is performed not to change the brake feeling by the driver of the vehicle. The second operating mode is selected as the operating mode under a predetermined condition (here, under the establishment of fade condition), or regardless of the establishment of the predetermined condition, when reaching to the assisting limit or a sudden brake operation is performed. Under this operating mode, a high master hydraulic pressure (wheel cylinder hydraulic pressure, braking force) which reflects directly on the brake operation by the driver of the vehicle can be generated. Upon such situation, the specific holding control is executed to maintain the actual servo pressure. Therefore, under the second operating mode where the brake operation and the movement of the first master piston 14 are mechanically co-operated, no brake operation variation or change occurs which is caused by the actual servo pressure variation or change, which leads to suppression of worsening of the brake feeling.

Under the state that the first hydraulic pressure chamber 1B is in a liquid-tight sealing state (the first control valve 22 is in a closed state), when the actual servo pressure is increased to advance the first master piston 14 forwardly, the input piston 13 advances in co-operation with the advance movement of the first master piston 14 and the brake pedal 10 is drawn-in. Oppositely, under the state that the first hydraulic pressure chamber 1B is in a liquid-tight sealing state, when the actual servo pressure is decreased to retreat the first master piston 14 rearward, the input piston 13 retreats in co-operation with the retreating movement of the first master piston 14 and the brake pedal 10 is pushed back. According to the embodiment, such variable movement of the brake pedal 10 in the second operating mode can be suppressed. In other words, according to the embodiment, the worsening of brake feeling can be suppressed and at the same time the operating mode can be appropriately switched over depending on the situations.

Further, in one brake stage, once the second operating mode is selected, the second operating mode continues in the decreasing stage. Thus, occurrence of worsening of the brake feeling due to the switching over operation of the operating mode from the second operating mode to the first operating mode in the brake stage can be prevented. Further, in the decreasing stage where the second operating mode has been selected, a control, in which the smaller the operating amount, the smaller the actual servo pressure is set, is executed. Accordingly, the pilot pressure (actual servo pressure) can be decreased in response to the releasing operation. Further, in the decreasing stage where the second operating mode has been selected, a control, in which the smaller the decreasing speed of the operating amount, the smaller the actual servo pressure is set, is executed. Accordingly, the releasing operation becomes gradual and in response to such gradual releasing operation, the actual servo pressure can be also gradually decreased in response to such gradual releasing operation. Upon such operation, by using the hysteresis-considered control current as the control current, the flow-rate of the pressure decreasing valve 41 can be reduced to thereby reduce the decreasing pressure amount per unit time relative to the pilot pressure.

According to the embodiment, the above switching over control is used for switching over operation of the operating mode in a fade state judgement. According to the embodiment, even the vehicle state is judged to be in the fade state, normal brake feeling can be maintained in the first operating mode at least until becoming the first timing (assisting limit reaching timing) or until becoming the second operating timing (sudden brake operation timing) (i.e., in normal area). Thus, even the vehicle state is judged to be in a fade state, the brake feeling change can be suppressed until a proper timing. Further, even the operating mode is switched over, by executing the specific holding control (holding control in fade state), the worsening of brake feeling (for example, draw-in phenomenon of the input piston 13) can be suppressed. On the other hand, the judgement by the fade judging portion 62 is made by calculation (presumption) based on mainly various conditions and there may sometime happen an erroneous judgement. However, according to the embodiment, even under an erroneous judgement, at least the normal brake operation is performed in the normal area to maintain the normal brake feeling.

Further, upon selecting the second operating mode, by opening the second control valve 23 after closing the first control valve 22 by the control portion 61, the brake pedal 10 drawn-in phenomenon (advance movement) caused by the fluid in the first hydraulic pressure chamber 1B flowing out therefrom to the reservoir 173 is prevented. Further, as explained above, by adopting the target discharge flow-rate for the control flow-rate of the pressure decreasing valve 41 every predetermined time (every time after the predetermined time passed), the control portion 61 can more securely decrease the pilot pressure (actual servo pressure). For example, when the valve opening current learning value of the pressure decreasing valve 41 memorized in the brake ECU 6 is deviated in more lower side than the actual valve opening current (true value), the pressure decreasing valve 41 does not open even the control current is reduced to equal to or less than the valve opening current, which may lead to a situation that the pilot pressure cannot be decreased. However, according to the embodiment, by the control using the target discharge flow-rate, even under the second operating mode, more securely the pilot pressure (actual servo pressure) can be decreased.

Further, when the brake stage ended (the operating amount in the decreasing stage becomes zero) and switching over of the operating mode is performed from the second operating mode to the first operating mode, the control portion 61 opens the first control valve 22 after closing the second control valve 23. Accordingly, even when the brake operation starts immediately after the brake stage ended, the drawn-in phenomenon of the brake pedal 10 can be prevented to suppress the deterioration of brake feeling.

(Others)

The invention is not limited to the embodiment explained above. For example, switching over control for the operating mode is not limited to the time when the fade judgement is made according to the embodiment, but may be performed under any other situations (for example, a situation where a high braking force is required). Further, the timing of starting switching over operation of the operating mode (timing of selecting the second operating mode) may be set to any time after the first timing or the second timing. The first timing and the second timing may be the same or may be different from each other. It is further noted that the regulator 44 is not limited to the present embodiment, and the regulator 44 may have a spool valve mechanism including a spool (spool type piston) and a sleeve.

REFERENCE SIGNS LIST

1; master cylinder, 11; main cylinder, 12; cover cylinder 13; input piston, 14; first master piston, 15; second master piston, 1A; servo chamber, 1B; first hydraulic pressure chamber (separation chamber), 1C; second hydraulic pressure chamber (reaction force chamber), 1D; first master chamber, 1E; second master chamber, 10; brake pedal (brake operating member), 171, 172, 173, 434; reservoir, 2; reaction force generating device, 22; first control valve (electromagnetic valve), 23; second control valve, 4; servo pressure generating device, 41; pressure decreasing valve, 42; pressure increasing valve, 431; accumulator (pressure source), 44; regulator, 445; control piston, 4D; first pilot chamber, 5; actuator, 541, 542, 543, 544; wheel cylinder, 5FR, 5FL, 5RR and 5RL; wheel, BF; hydraulic pressure braking force generating device, 6; brake ECU, 61; control portion, 62; fade judging portion, 63; operation judging portion, 71; stroke sensor, 73, 74, 75; pressure sensor, 76; wheel speed sensor, A; braking device for vehicle, C; friction brake device.

The invention claimed is:

1. A braking device for a vehicle capable of switching over an operating mode between a first operating mode in which a master piston or a drive piston which drives the master piston is driven by a drive hydraulic pressure based on a hydraulic pressure of a pressure source in response to a detection result of a brake operation by a driver of the vehicle and a second operating mode in which the brake operation by the driver of the vehicle is mechanically transmitted to the master piston, wherein the braking device for the vehicle comprises:

an operation judging portion which judges, in a brake stage including an increasing stage where an operating amount of the brake operation by the driver of the vehicle increases from a value of zero and a decreasing stage where the operating amount decreases to the value of zero, whether or not the operating amount in the increasing stage is equal to or more than a predetermined threshold amount or whether or not an increasing speed of the operating amount in the increasing stage is equal to or more than a predetermined threshold speed; and a control portion which selects the first operating mode as the operating mode, at least from a start of the increasing stage until a first timing where the operating amount is judged to be equal to or more than the predetermined threshold amount by the operation judging portion or until a second timing where the increasing speed is judged to be equal to or more than the predetermined threshold speed by the operation judging portion and which selects the second operating mode as the operating mode in the increasing stage after the first timing or the second timing and at the same time maintains the drive hydraulic pressure.

2. The braking device for a vehicle according to claim 1, further comprising:

a master cylinder including a master chamber in which a master hydraulic pressure is generated by driving the master piston;

a wheel cylinder in which a hydraulic pressure is generated based on the master hydraulic pressure;

an input piston disposed in the master cylinder and defining a separation chamber filled with a fluid in the master cylinder with the master piston, the input piston being co-operated with an operation of a brake operating member;

an electromagnetic valve which opens or closes the separation chamber, wherein the control portion, upon selection of the second operating mode in the increasing stage, operates the electromagnetic valve to be in a valve closed state.

3. The braking device for the vehicle according to claim 1, wherein the control portion, in the decreasing stage of the brake stage where the second operating mode has been selected in the increasing stage, selects the second operating mode as the operating mode and sets the drive hydraulic pressure such that the smaller the operating amount in the decreasing stage, the smaller the drive hydraulic pressure becomes.

4. The braking device for the vehicle according to claim 3, wherein the control portion sets a decreasing speed of the drive hydraulic pressure such that the smaller a decreasing speed of the operating amount in the decreasing stage, the smaller the decreasing speed of the drive hydraulic pressure becomes.

5. The braking device for the vehicle according to claim 1, further comprising:

a fade judging portion which judges whether or not a vehicle state is in a fade state, wherein the control portion, under a premise that at least the vehicle state is judged to be in the fade state by the fade judging portion, selects the second operating mode as the operating mode in the increasing stage.

6. The braking device for the vehicle according to any claim 1, wherein the predetermined threshold amount is set to be equal to or less than the operating amount at which the drive hydraulic pressure reaches to a hydraulic pressure corresponding to the hydraulic pressure of the pressure source.

\* \* \* \* \*